(12) United States Patent
Stamp et al.

(10) Patent No.: US 8,945,327 B2
(45) Date of Patent: Feb. 3, 2015

(54) SANDWICH COMPONENT AND METHOD FOR THE PRODUCTION THEREOF

(75) Inventors: Benno Stamp, Stuttgart (DE); Sebastian Iwan, Chemnitz (DE); Hubert Bieder, Denkendorf (DE); Ralph Greiner, Leonberg (DE); Tino Zucker, Mildenau (DE); Wolfgang Nendel, Oederan (DE)

(73) Assignee: Daimler AG, Stuttgart (DE)

( * ) Notice: Subject to any disclaimer, the term of this patent is extended or adjusted under 35 U.S.C. 154(b) by 326 days.

(21) Appl. No.: 13/574,306

(22) PCT Filed: Dec. 9, 2010

(86) PCT No.: PCT/EP2010/007511
§ 371 (c)(1),
(2), (4) Date: Aug. 14, 2012

(87) PCT Pub. No.: WO2011/088871
PCT Pub. Date: Jul. 28, 2011

(65) Prior Publication Data
US 2012/0315429 A1    Dec. 13, 2012

(30) Foreign Application Priority Data
Jan. 22, 2010   (DE) .......................... 10 2010 005 456

(51) Int. Cl.
*B32B 3/02*   (2006.01)
*B32B 37/10*  (2006.01)
(Continued)

(52) U.S. Cl.
CPC ........... *B32B 38/1866* (2013.01); *B29C 70/028* (2013.01); *B29C 70/46* (2013.01);
(Continued)

(58) Field of Classification Search
CPC ...... A47G 27/02; B29C 43/00; B29C 70/028; B32B 3/02; B32B 3/04; B32B 3/12; B32B 3/263; B60R 5/00; B60R 5/04; B60R 13/00; B60R 13/011; B62D 25/20; B44C 5/00
USPC ......................................... 156/213, 212, 216
See application file for complete search history.

(56) References Cited

U.S. PATENT DOCUMENTS

| 4,496,024 A | 1/1985 | Wolf et al. |
| 4,871,491 A | 10/1989 | McMahon et al. |

(Continued)

FOREIGN PATENT DOCUMENTS

| CN | 1681643 A | 10/2005 |
| DE | 10214024 A1 | 10/2003 |

(Continued)

OTHER PUBLICATIONS

Office Action issued Aug. 28, 2013, in Japanese Patent Application No. 2012-549259 (with English-language translation).

(Continued)

*Primary Examiner* — Brent O'Hern
(74) *Attorney, Agent, or Firm* — Patent Central LLC; Stephan A. Pendorf

(57) ABSTRACT

The present invention relates to a sandwich component, which comprises a honeycomb core (1) having a plurality of webs (1') and at least one cover layer (2, 3), wherein the honeycomb core (1) is made of a cellulose-based material, in particular paper. The cover layer (2, 3) is formed from a fiber-reinforced semifinished product having a thermoplastic material matrix, wherein the webs (1') of the honeycomb core (1) are partially received into the thermoplastic material matrix of the cover layer (2, 3) at connection points (A) to the cover layer (2, 3) so that the sandwich component is bonded. The invention further relates to production methods for the sandwich component.

7 Claims, 4 Drawing Sheets

(51) Int. Cl.

| | | |
|---|---|---|
| *B32B 38/18* | (2006.01) | |
| *B29C 70/02* | (2006.01) | |
| *B29C 70/46* | (2006.01) | |
| *B29C 70/86* | (2006.01) | |
| *B32B 3/12* | (2006.01) | |
| *B32B 29/00* | (2006.01) | |
| *B32B 37/14* | (2006.01) | |
| *B60N 2/68* | (2006.01) | |
| *B29C 70/22* | (2006.01) | |
| *B29K 1/00* | (2006.01) | |
| *B29K 101/12* | (2006.01) | |
| *B29L 31/60* | (2006.01) | |
| *B32B 37/00* | (2006.01) | |
| *B32B 37/04* | (2006.01) | |
| *B32B 37/06* | (2006.01) | |
| *B32B 38/16* | (2006.01) | |

(52) U.S. Cl.
CPC .................. *B29C 70/86* (2013.01); *B32B 3/12* (2013.01); *B32B 29/00* (2013.01); *B32B 37/146* (2013.01); *B60N 2/686* (2013.01); *B29C 70/22* (2013.01); *B29K 2001/00* (2013.01); *B29K 2101/12* (2013.01); *B29L 2031/608* (2013.01); *B32B 37/0038* (2013.01); *B32B 37/04* (2013.01); *B32B 37/06* (2013.01); *B32B 2038/166* (2013.01); *B32B 2305/076* (2013.01); *B32B 2305/10* (2013.01); *B32B 2309/02* (2013.01); *B32B 2317/12* (2013.01); *B32B 2605/003* (2013.01)
USPC ........................... 156/213; 156/212; 156/216

(56) References Cited

U.S. PATENT DOCUMENTS

| | | | |
|---|---|---|---|
| 4,902,365 | A | 2/1990 | Westlake, Sr. |
| 6,551,441 | B1 | 4/2003 | Sato et al. |
| 8,007,706 | B2 | 8/2011 | Wacker et al. |
| 2002/0086912 | A1 | 7/2002 | Hookham et al. |
| 2002/0095127 | A1 | 7/2002 | Fish et al. |
| 2003/0197400 | A1* | 10/2003 | Preisler et al. ............... 296/214 |
| 2011/0101731 | A1 | 5/2011 | Legler et al. |

FOREIGN PATENT DOCUMENTS

| | | |
|---|---|---|
| DE | 10255039 A1 | 6/2004 |
| DE | 102004015472 A1 | 10/2005 |
| DE | 102006014313 A1 | 10/2007 |
| DE | 102007007554 A1 | 8/2008 |
| DE | 102007034543 A1 | 1/2009 |
| EP | 0347599 A2 | 12/1989 |
| EP | 0894611 A1 | 2/1999 |
| EP | 0967070 A1 | 12/1999 |
| EP | 1626852 B1 | 2/2006 |
| JP | 60209033 A | 10/1985 |
| JP | 62019430 A | 1/1987 |
| JP | 2001150575 A | 6/2001 |
| JP | 2008254437 A | 10/2008 |
| WO | 2004080698 A1 | 9/2004 |
| WO | 2010006718 A1 | 1/2010 |

OTHER PUBLICATIONS

Office Action issued Dec. 26, 2013, in Chinese Patent Application No. 201080061972.1 (with English-language translation).

* cited by examiner

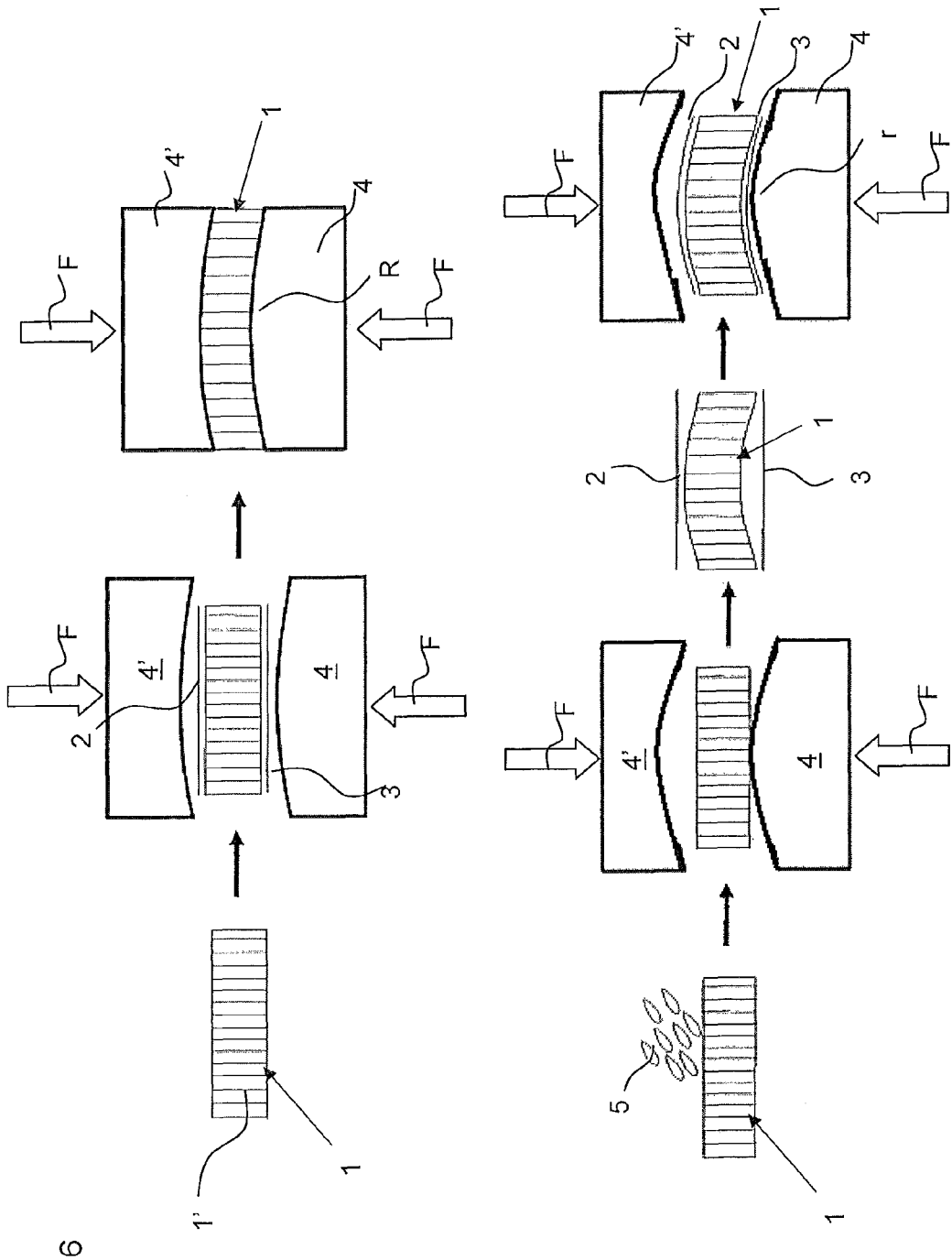

SANDWICH COMPONENT AND METHOD FOR THE PRODUCTION THEREOF

SEQUENCE LISTING

Not Applicable

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FIILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

1. Field of the Invention

The invention relates to a sandwich component comprising a cellulose-based honeycomb core and at least one cover layer and to a method for the production thereof.

2. Description of Related Art including information Disclosed under 37 and 1.97 and 1.98

As part of the light-weight strategy, which in motor vehicle manufacture is in particular aimed at reducing both fuel costs and carbon dioxide emissions, components having a sandwich structure are increasingly used, having a significantly lower weight than conventional components owing to the low density of the core material while still being able to offer adequate strength values if a suitable cover layer material is selected. From the aerospace sector, sandwich components with a high load-bearing capacity are known, the honeycomb cores of which usually consists of high-value and therefore expensive phenolic resin-impregnated aramid paper. The cover layers are made of reinforcing fibers in a thermosetting matrix. Such sandwich components are primarily produced using the autoclave method or by hard laminating. These production methods allow only for short production runs and are highly cost-intensive and therefore not suitable for the mass production of motor vehicle components. In addition, the high-value materials contribute to high costs.

From prior art, DE 10 2007 007 554 A1 describes a rigid planar composite component of a vehicle which can be used as a sliding roof, a rear shelf, a loading platform or the like and a method for the production thereof. This composite component consists of a core layer placed between two cover layers—each made of a fiber-reinforced polyurethane layer—which core layer may have a honeycomb structure with a profiled reinforcing element embedded therein. To produce the composite component, the reinforcing element is first installed into recesses provided for this purpose in the core layer, the core layer is then placed between two fiber layers, each being sprayed with the polyurethane, and finally the sandwich is pressed in a pressing tool for shaping and curing the composite component.

WO 2004/080698 A1 further describes a method for the production of a thermoplastic composite structure reinforced with long fibers, using a hybrid or blended yarn of reinforcing and thermoplastic fibers which are fed to a heated and lobed nozzle in which the reinforcing fibers are intensively impregnated with the thermoplastic material. The thermoplastic fiber material comprises polyethylene, polyethylene terphthalate, polybutylene terphthalate, nylon, thermoplastic polyurethanes, polyacetal, polyphenyl sulphide, cyclo-olefin copolymers, thermotropic polyesters and blends thereof.

BRIEF SUMMARY OF THE INVENTION

On the basis of this prior art, it is desirable to provide a sandwich component made of low-cost materials which has improved mechanical properties and/or an improved surface quality and which can be produced by simple means.

This problem is solved by a sandwich component, which comprises a honeycomb core (1) having a plurality of webs (1') and at least one cover layer (2,3), wherein the honeycomb core (1) is made of a cellulose-based material, in particular paper. The cover layer (2,3) is formed from a fiber-reinforce semifinished product having a thermoplastic material matrix, wherein the webs (1') of the honeycomb core (1) are partially received in the thermoplastic material matrix of the cover layer (2,3) at connection points (A) to the cover layer (2,3) so that tha sandwich component is bonded.

The sandwich component is preferably used as a load-bearing component or an interior trim element for a motor vehicle selected from a floor plate, a rear seat backrest, a roof lining, a seat component, a central door panel and a door leaf.

The invention is further based on the problem of creating methods for producing large numbers of the sandwich component using a minimum of process steps and short cycle times.

This problem is solved by the methods wherein the edges 10 of the honeycomb core 1 are sealed by foldingover the semi-finished material 2 forming the cover layer, for example by means of a simple constructive modification of the pressing tool comprising the upper die 4 and the lower die 4'.

A first embodiment therefore relates to a sandwich component comprising a honeycomb core having a plurality of webs, at least one surface and preferably both the top and the underside being provided with a cover layer. In order to achieve a significant weight reduction, the honeycomb core can be made of a cellulose-based material, which is extremely inexpensive, the honeycomb structure giving the core a low density combined with a high specific rigidity. The cover layer(s) is/are made of a fiber-reinforced semi-finished material with a thermoplastic matrix, which can also reduce the material costs of the component while providing the sandwich component with adequate strength. Owing to the use of a thermoplastic matrix, an additional bonding agent or adhesive can advantageously be omitted, because the thermoplastic material, if heated, is capable of bonding with the honeycomb core. In this process, the webs of the core are partially accommodated in the thermoplastic matrix at the connecting points to the cover layer made of the fiber-reinforced semifinished material, providing the composite sandwich component with a firm bond between the honeycomb core and the cover layer.

In one embodiment, the fiber-reinforced semi-finished material with the thermoplastic matrix may be a hybrid fiber fabric comprising reinforcing fibers and non-consolidated thermoplastic fibers. The use of the hybrid fiber fabric enables the sandwich component to be produced cost-effectively, the flexibility of the hybrid fiber fabric making an arrangement on the honeycomb core easier, because the hybrid fiber fabric can adapt more easily to different structures and/or shapes; in addition, a very good bond can be obtained between the cover layer made of the hybrid fiber fabric and the honeycomb core.

As an alternative, the fiber-reinforced semi-finished material with the thermoplastic matrix may be consist of a pre-consolidated thermoplastic plate with an embedded reinforcing fiber fabric in a further embodiment; this is also known as "organoplate". One advantage of using an organoplate is the better—because smoother—surface quality of the cover layers, and on the other hand, sandwich components having organoplates as cover layers can reach better mechanical strength values, which is due to the pre-consolidation of the semi-finished material.

In addition to fiber fabrics, interlaid scrim, knitted fabrics, thin non-woven fabrics or the like are also suitable. Non-woven fabrics should preferably have a density of more than 800 $g/m^3$.

Suitable materials for the reinforcing fibers include glass fibers, carbon fibers, aramid fibers and/or natural fibers, while suitable thermoplastics include polypropylene, polycarbonate, polyamide and acrylonitrile-butadiene-styrene.

A sandwich component produced in this way can be used for producing a motor vehicle part; such parts include both load-bearing elements such as floor plates or rear seat backrests and mouldings, in particular interior trim elements. Suitable examples are a vehicle roof lining, a seat component, a central door panel and a door leaf.

One embodiment of the invention relates to a method for the production of a sandwich component having a flat shape or a large radius of curvature, i.e. a slightly curved shape. For the production of the flat or slightly curved sandwich component, the method according to the invention first comprises the step of providing the cellulose-based honeycomb core and the fiber-reinforced semi-finished material with a thermoplastic matrix for forming at least one—preferably two—cover layer(s) between which the honeycomb core is to be sandwiched. This is followed by placing the semi-finished material above and/or below the honeycomb core, thus providing a sandwich assembly. To form the cover layer and the shape of the sandwich component, which may be curved, the assembly consisting of the honeycomb core and the semi-finished material is placed in a pressing tool with upper and lower dies matching the radius of the component, if any, in order to provide a sandwich component of the predetermined shape. The predetermined shape is then produced in a next step by applying a defined pressure while bonding the sandwich assembly consisting of the semi-finished material and the honeycomb core; in this process, the pressing tool applies pressure to the assembly. In this process, the thermoplastic matrix of the semi-finished material, which is subjected to a temperature between the glass transition temperature and the melting point of the plastic, melts at least partially in the regions of increased pressure and partially accommodates the webs of the honeycomb core in the connecting regions for the cover layer made of the fiber-reinforced semi-finished material with the thermoplastic matrix.

The component can then be removed from the pressing tool and cooled, or it may be cooled in the open or closed tool.

The press is preferably kept at a constant temperature. The insert including the warm and still unstable sandwich is removed from the heated press and placed in a cold tool. Here, the sandwich is cooled and solidified within a short time. If required, the pressure can be increased, effecting a change in the surface quality of the component and in the mechanical bond between core and cover layer.

The method according to the invention therefore allows the production of the sandwich component using fewer process steps in a simple tool, and the components can be produced in large numbers with short cycle times.

A second method relates to the production of a more tightly curved sandwich component, i.e. a component having a smaller radius of curvature, which necessitates further steps for processing a honeycomb core made of a cellulose material. To obtain a component with a tighter curvature or smaller radii, the honeycomb core is first wetted with water or another suitable aqueous medium or another suitable liquid, possibly by spraying or subjecting to steam, in order to improve its deformability, so that the formed honeycomb core retains its shape after the forming process. In addition to water, starch-dissolving solutions are suitable for this purpose.

This method allows the production of complex components which may have few, if any, flat surfaces and a 3-dimensional structure.

When producing paper hexagon honeycombs or similar geometries, the honeycombs can be expanded in the process. For this purpose, the pre-bodies of the hexagonal honeycombs are expanded in the expansion system under water supply, obtaining their final shape. The paper hexagon honeycombs are then dried. The wetting required for expansion is advantageously carried out in the wetting process step. This is only possible if using an expansion honeycomb. In the production of sine honeycombs, for example, the production of the honeycomb core does not involve any wetting. For this reason, separate wetting is required when using a sine honeycomb.

In a next step, the wetted honeycomb core is placed in a pressing tool the upper and lower die of which provide the preset curved shape corresponding to the component radius. The wetted honeycomb core is then subjected to pressure in the pressing tool and formed at a temperature in a range of 40 to 200 degrees C. A drying time of the wetted honeycomb core is directly determined by this temperature. By wetting the honeycomb core, this method can obtain more complex contours without any crack damage to the honeycomb core. The formed honeycomb plate itself is stable owing to the starch contained in the paper and to the adhesive used for bonding the honeycomb core, and it maintains its new shape.

After the honeycomb core has been subjected to the forming step, the pressing tool is opened, so that the semi-finished material(s) can be placed above and/or below the formed honeycomb core, creating the sandwich assembly from the fiber-reinforced semi-finished materials with the thermoplastic matrix and the honeycomb core.

The formation of the cover layers and the bonding between the semi-finished materials and the honeycomb core can be carried out in the same pressing tool in which the honeycomb core was formed, the thermoplastic matrix being bonded to the honeycomb core or its webs respectively as described for the above embodiment. The thermoplastic matrix, which is subjected to a temperature between the glass transition temperature and the melting point of the plastic, at least partially starts to melt under the pressure of the pressing tool and therefore partially accommodates the webs at their connecting points, thereby providing the bond between the fiber-reinforced semi-finished material with the thermoplastic matrix and the honeycomb core.

Depending on the thermoplastic material, the temperature is selected such that the plastic starts to melt locally at points of increased pressure, which include the connecting points to the webs, so that the webs can penetrate into the fiber-reinforced semi-finished materials with the thermoplastic matrix, thus providing the bond.

The temperature to be applied to the thermoplastic matrix can in both methods be provided by a heater in the pressing tool; alternatively, the semi-finished materials can be subjected to the required temperature in a separate heating device before the sandwich assembly is placed in the pressing tool. The advantage of this arrangement is that the pressing tool has to be heated only slightly or not at all, so that the cycle time for the production of the component can be shortened further. Moreover, the sandwich component can be finished better in a cold tool, and the cover layer becomes harder if a cold tool is used. The heated cover layer cures faster if a cold tool is used, particularly at temperatures below approximately 80 degrees C. In addition, damage to the sandwich component during removal from the pressing tool can be avoided.

In a further embodiment of the two methods according to the invention, the plastic matrix can be bonded to the webs by providing that the pressing tool compresses the webs to some degree under tool-path control. This creates a larger bonding surface with the cover layer while effecting a slight impregnation of the webs in the connecting region to the thermoplastic material, which further improves the bond.

As a rule, the webs are compressed only slightly, in particular by less than 10% of the honeycomb thickness, by a length predetermined by a tool-path control of the pressing tool, without significantly reducing the thickness of the component.

Finally, the sandwich component can be provided with an edge seal in the production process by providing that the semi-finished material for a cover layer has dimensions which overlap a surface of the honeycomb core and its edge surfaces. While pressure is then applied in the bonding process, the projecting edges of the semi-finished material can be bent around the edge of the honeycomb core in the pressing tool, so that the honeycomb core edge is sealed by the local melting of the thermoplastic matrix and the bonding to the honeycomb core and/or to the second cover layer.

A further development of the invention provides for the application of a decorative coating to the top and/or bottom layer during the production process in the hot pressing tool. In this process, the melting of the thermoplastic material provides a direct bond between the decoration, the cover layer or the thermoplastic material on the one hand and the honeycomb core on the other hand in the heated pressing tool. This is for example very effective when using a polyester nonwoven fabric as a decorative material. There is no need for the additional process step of lamination. The decorative material has to be sufficiently thermostable in this case.

This advantage and further advantages are explained in the following description with reference to the accompanying figures.

The reference to the figures in the description should make the subject matter understood more easily. Objects or parts thereof which are essentially identical or similar may be identified by the same reference numbers. The figures only provide a diagrammatic representation of an embodiment of the invention.

BREIF DESCRIPTION OF THE DRAWINGS

Of the figures:

FIG. 6 is a diagrammatic representation of the process steps involved in an embodiment of the method for the production of flat or slightly curved components;

FIG. 7 is a diagrammatic representation of the process steps involved in a further embodiment of the method for the production of a component having more complex contours;

DETAILED DESCRIPTION OF THE INVENTION

The sandwich component according to the invention is mainly related to motor vehicle components, which may be load-bearing components such as a floor plate or a rear seat backrest, but it is also related to the production of trim parts, in particular in the interior of the motor vehicle.

Suitable cellulose materials for the honeycomb core include paper and cardboard.

The designation "honeycomb" is not intended to restrict the structure of the honeycomb core, but includes any structure constructed of webs and having a low density combined with a high compressive and shear strength. Suitable honeycomb structures include hexagonal bee honeycomb structures, corrugated, circular, diamond-shaped or rectangular folded structures as well as irregular, seemingly "organic", structures.

The use of fiber-reinforced thermoplastic materials for the cover layers of a sandwich component provided for the production of a motor vehicle component, as proposed by the invention, offers several advantages when compared to thermosetting systems.

In addition to low material costs and simpler storage, the system offers the possibility of thermal bonding to other thermoplastic materials and the cost-effective production of components in a pressing tool. By combining a paper honeycomb core with a fiber-reinforced thermoplastic material, a low-cost sandwich structure with a high light-weight construction potential can be obtained.

According to the invention, the cover layers of the sandwich component are formed from fiber-reinforced semi-finished materials with a thermoplastic matrix; two different thermoplastic fiber-reinforced semi-finished materials are in particular described as cover layers for the paper honeycomb core. On the one hand, hybrid yarn fabrics consisting of a reinforcing fiber (e.g. glass fiber) and a thermoplastic fiber (e.g. polypropylene) in a non-consolidated state are used to form a cover layer. On the other hand, pre-consolidated organoplates can be used as cover layers according to the invention. The thermoplastic matrix present in either case partially melts in the forming process and bonds with the honeycomb core.

The cover layers made of the various semi-finished materials and their adhesion to a paper honeycomb core are described in greater detail below. Microscopic pictures of the bonding regions are provided in FIGS. 3a, 3b and 4.

Figure 1A:
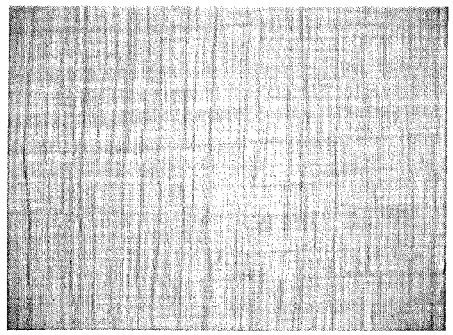
FIG. 1a is an enlarged illustration of a section of an organoplate.
Figure 1B:
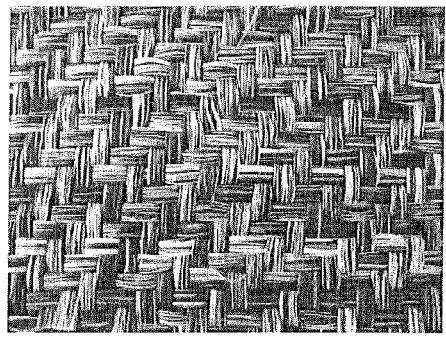
FIG. 1b is an enlarged illustration of a section of a hybrid fiber fabric.

A picture of a pre-consolidated fiber-reinforced thermoplastic material—a so-called organoplate—is shown in FIG. 1a. A non-consolidated fiber-reinforced thermoplastic material—in this case a hybrid yarn fabric—is shown in FIG. 1b. FIGS. 1a and 1b allow a comparison between the two semi-finished material types, from which differences in the fiber and weave structure can be derived.

Pre-consolidated thermoplastic plates or organoplates as shown in FIG. 1 offer the advantage that the re-melting and pressing of the polypropylene results in an optimum fiber-to-matrix adhesion. However, pre-consolidation produces a relatively rigid plate, which makes the subsequent forming processes more difficult than when using hybrid fabrics, which—not being consolidated—are fairly flexible. For this reason, organoplates are more suitable for flat or slightly curved sandwich components.

Figure 5:
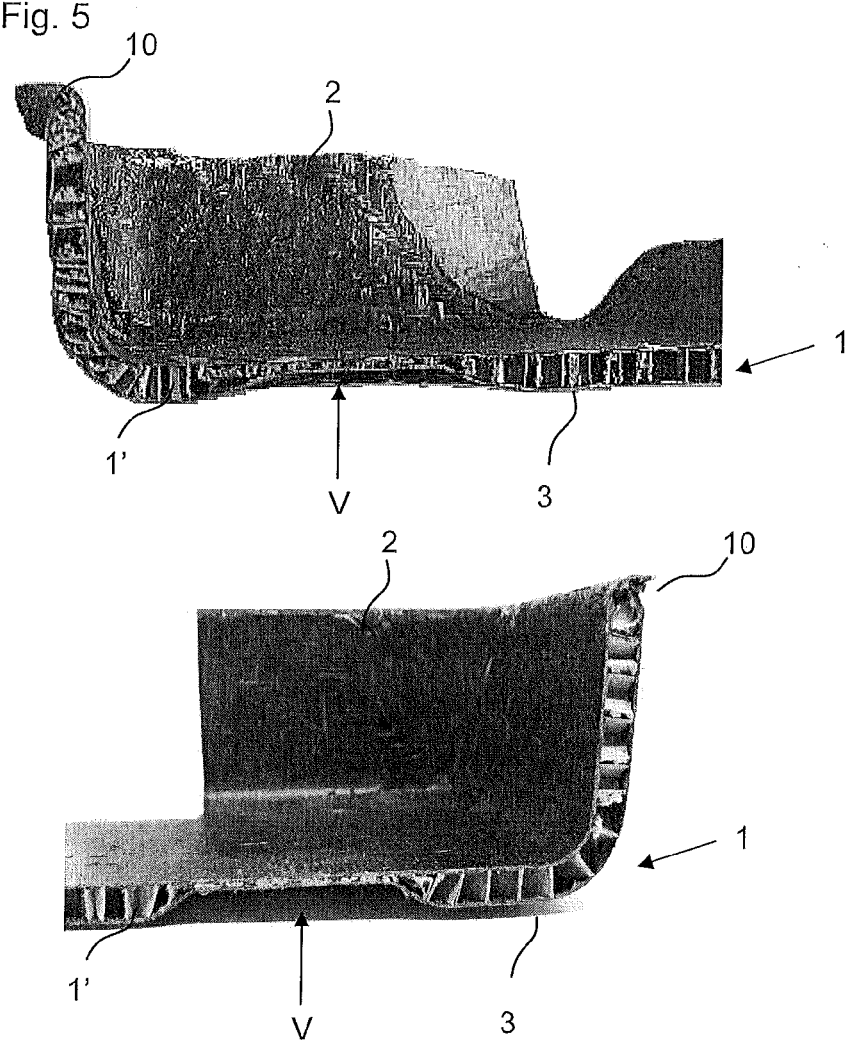
FIG. 5 shows two perspective views of a cut-open sandwich component.

The non-consolidated hybrid yarn fabric shown in FIG. 1b, on the other hand, is highly drapeable, making these semi-finished materials particularly suitable for structures requiring major forming operations, for example when producing components having complex structures, such as the sandwich component from FIG. 5.

In both cases, the adhesion between the paper honeycomb and the thermoplastic materials is exclusively based on the melting of the thermoplastic material, so that additional adhesives such as polyurethane foam can be omitted with beneficial effects in terms of cost, weight and process steps.

Figure 2:
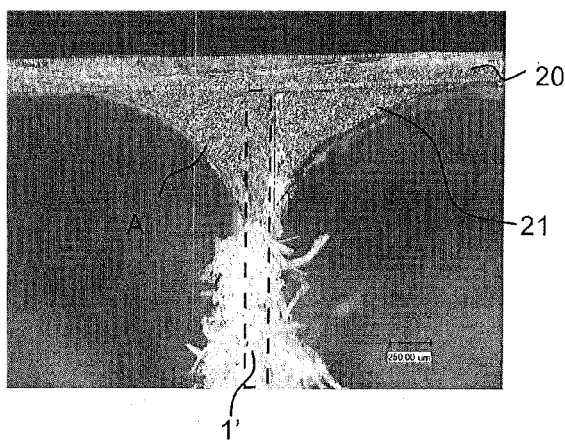
FIG. 2 is an enlarged illustration of a section of a bond created between a corrugated-web honeycomb and a cover layer by means of PUR foam from prior art.

FIG. 2 illustrates the bonding of a cover layer 20 to the honeycomb web 1' by means of PUR foam 21 in accordance with prior art. When using a PUR foam 21, a fillet weld forms in the connecting region A between the cover layer 20 and the web 1' of the paper honeycomb, which significantly increases the bonding surface and results in a good adhesion of the cover layer. The formation of a fillet wells, however, requires the introduction of additional material.

Figure 3A:
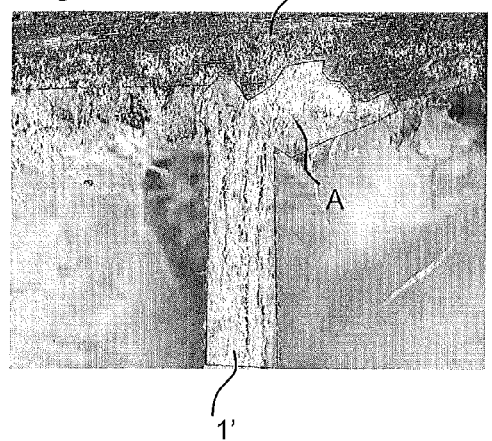
FIG. 3a is an enlarged illustration of a section of a bond of a corrugated-web honeycomb by means of melting the thermoplastic matrix.
Figure 3B:
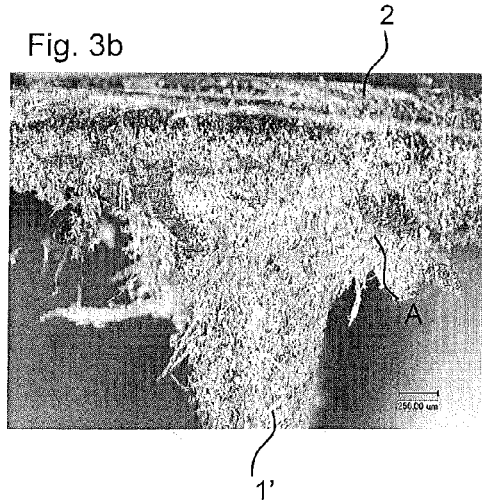
FIG. 3b is an enlarged illustration of a section of a bond between a corrugated web and a cover layer made of a non-pre-consolidated PP glass fabric.
Figure 4:
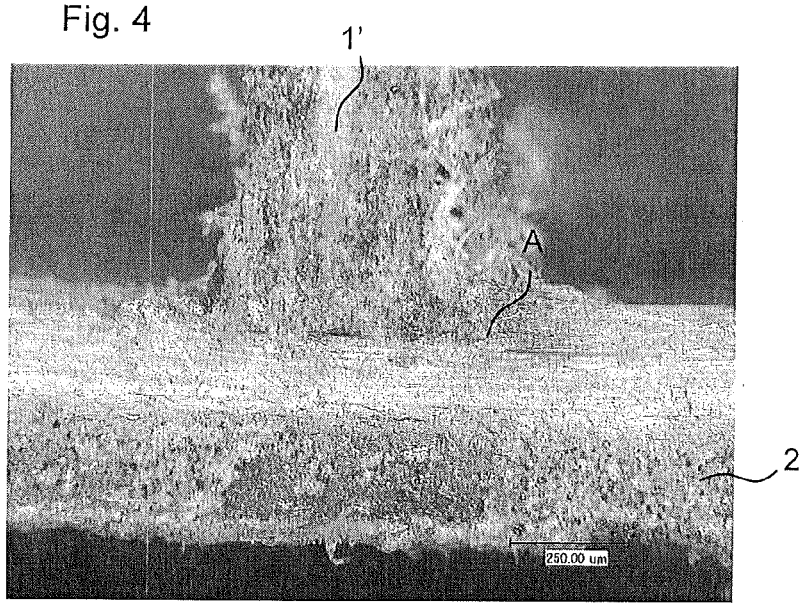
FIG. 4 is an enlarged illustration of a section of a butt bond between a corrugated web and a cover layer made of a pre-consolidated PP glass fabric.

According to the invention, on the other hand, as illustrated by FIGS. 3a, 3b and 4, an optimum bond can be obtained without the introduction of additional material, because the bond between a honeycomb web core 1' and the cover layer 2 in the connecting region A develops in the melting range of the thermoplastic material under the application of a defined pressure. Depending on whether the semi-finished material used is a hybrid yarn fabric or an organoplate, the web 1' then penetrates the thermoplastic matrix to a greater or lesser degree.

One of the aims of using a thermoplastic matrix is therefore the pressing of the web of the paper honeycomb into the matrix in order to obtain as large a bonding surface as possible. While FIG. 2 clearly shows the formation of a fillet weld by a PUR foam for bonding the web 1' to the cover layer 20, FIG. 3a shows a typical bonding of the web 1' and the cover layer 2 in the connecting region A, which can be obtained by melting the thermoplastic matrix for the formation of the cover layer (in this case a hybrid fabric). The web 1' is in this process pressed into the cover layer 2 in the connecting region A, resulting in a bond of equal quality to that achieved by the fillet weld of PUR foam shown in FIG. 2.

In non-pre-consolidated fabrics, i.e. the hybrid fabrics (shown in FIGS. 3a and 3b), the honeycomb webs 1' adhere better to the cover layers 2, while the bond between organoplates and honeycomb webs as shown in FIG. 4 is slightly less strong because the webs 1' penetrate the cover layer 2 less deeply. The better bond when using hybrid yarn fabrics is primarily due to their flexibility and their very good draping capacity, so that individual hybrid rovings come to lie around the edge of the paper honeycombs even at low pressures. The subsequent melting of the matrix then creates a relatively large connecting region A.

To bond the honeycomb webs 1' to the rigid organoplate (FIG. 4), a higher pressure has to be applied in the pressing tool in order to press the webs 1' to some degree into the thermoplastic matrix of the cover layer 2 in the connecting region A. This higher pressure can level any irregularities across the thickness of the honeycomb. Using pre-consolidated plates as cover layers, the sandwich component acquires a T-butt joint between the webs 1' and the cover layer 2. As a result of this relatively small bonding surface, sandwich components with organoplates as cover layers are used in applications which are subjected to only a low, if any, shear load on the core.

Both organoplates and hybrid yarn fabrics offer advantages as cover layers for a paper honeycomb core and can accordingly be used as motor vehicle components. Organoplates combined with a paper honeycomb core offer a better surface quality and better mechanical properties such as strength owing to their pre-consolidation, but the bond to the honeycomb core is less strong.

On the other hand, the use of hybrid yarn fabrics as cover layers combined with a paper honeycomb core offers a good bond between the paper honeycomb core and the hybrid yarn fabric and is cheaper, because the consolidation process is carried out while the sandwich is produced in the pressing tool. In addition, the hybrid yarn fabric is more easily arranged on the honeycomb core than the organoplates and drapes better, in particular if the component has a complex contour. On the other hand, the cover layers of hybrid yarn fabrics do not reach the surface quality and the specific (mechanical) properties of the cover layers made of organoplates.

For both semi-finished materials, the same base materials can be used for the thermoplastic matrix and the reinforcing fiber. Reinforcing fibers may for example be glass fibers, carbon fibers, aramid fibers or natural fibers. Suitable thermoplastic materials include polypropylene, polycarbonate, polyimide, acrylonitrile-butadiene-styrene as well as polyethylene, polyethylene terphthalate, polybutylene terphthalate, thermoplastic polyurethanes, polyacetal, polyphenyl sulphide, cyclo-olefin copolymers, thermotropic polyesters and blends thereof.

Suitable production processes for the sandwich component according to the invention are explained in greater detail below with reference to FIGS. 6 to 9. A production process for flat or slightly curved sandwich components made of a paper honeycomb core and fiber-reinforced thermoplastic layers, i.e. of pre-consolidated organoplates or hybrid fiber fabrics, is illustrated diagrammatically in FIG. 6. For more complex shapes of a sandwich component or tighter curvatures with smaller radii r, a production process illustrated diagrammatically in FIG. 7 can be used.

To produce a slightly curved component with a large radius R as shown in FIG. 6, the honeycomb core is not preformed individually. This production variant is also used in the production of flat components. The honeycomb core 1 provided for the component, which is represented by a plurality of webs 1', is, together with the semi-finished material blanks 2, 3, placed in the pressing tool consisting of an upper die 4 and a lower die 4', which provides the curvature with the radius R for the component (if a flat component—not shown in the drawing—is to be produced, the pressing tool does not have any curvature). By applying compressive forces F symbolised by block arrows to the honeycomb core 1 sandwiched between the semi-finished materials 2, 3 in order to provide the pressure required for forming, the component is formed on the one hand while the thermoplastic matrix of the semi-finished materials 2, 3 is bonded to the webs 1' of the honeycomb core 1, the application of heat to the thermoplastic matrix of the semi-finished materials 2, 3 being carried out in the pressing tool itself as shown in FIG. 6.

For this purpose, the pressing tool comprises a suitable heating device, so that a temperature determined by the type of plastic material can be applied to the thermoplastic matrix of the semi-finished materials 2, 3; this temperature lies between the glass transition temperature and the melting point of the selected plastic material. There is no need to use an additional binder. The pressing tool can be tool-path controlled or force controlled, the former variant being preferred, because it results in some compression of the honeycomb core and the webs respectively in the connecting region to the cover layer and thus in better bonding.

Such a compression of the webs creates a larger connecting surface and thus a better bond or adhesion of the honeycomb core to the cover layers. In addition to the larger bonding surface provided by the compression, the webs of the honeycomb core are slightly impregnated in the bonding region as thermoplastic material penetrates into the paper material. The bonding quality can in this context be influenced by the selected temperature and by the closing time of the press.

FIG. 7 illustrates the process chain involved in the production of a motor vehicle component with smaller radii r or a more pronounced curvature; this requires additional process steps.

The honeycomb core 1 is first wetted with water 5 by steaming or spraying, so that it can be shaped to provide more complex contours with the smaller radius r without causing damage. By wetting, a better deformability is achieved and the later return of the finished components to the original shape is prevented. Also prevented is a tearing of the paper in the forming process. The stability of the paper core 1 after drying is not affected. The wetted honeycomb core 1 is placed in a pressing tool with an upper die 4 and a lower die 4' and there formed by, means of the compressive force F at a temperature in the range between 40 and 200 degrees C., the drying time depending on the selected temperature level. For better drying, openings can be provided in the pressing tool for water or water vapour to escape.

After opening the pressing tool, the formed honeycomb core 1 can be placed between the semi-finished materials 2, 3, which may be done either within or outside the pressing tool. The thermoplastic matrix of the semi-finished materials 2, 3 is bonded to the webs 1' of the honeycomb core 1 in a second pressing operation, preferably in the same pressing tool 4, 4' as previously, by creating the bond between the formed cover layers 2, 3 and the webs 1' of the honeycomb core 1 by allowing the webs 1' to penetrate the thermoplastic matrix of the semi-finished materials 2, 3 as described above at a temperature between the glass transition temperature and the melting point of the thermoplastic material. Here, too, the honeycomb core or the webs respectively can be compressed slightly to improve the bond.

Figure 8:
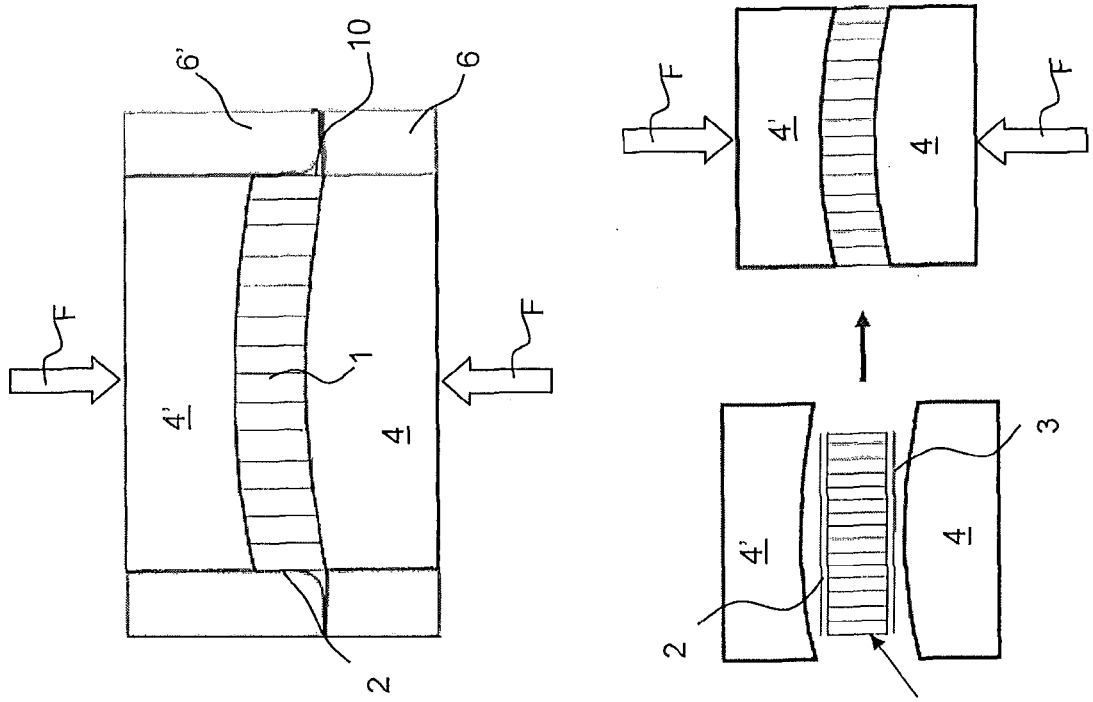
FIG. 8 is a diagrammatic representation of a pressing tool for edge sealing.

FIG. 8 illustrates how the edges 10 of the honeycomb core 1 can be sealed by folding over the semi-finished material 2 forming the cover layer by means of a simple constructive modification of the pressing tool comprising the upper die 4 and the lower die 4'. For this purpose, the lower die 4' of the pressing tool is provided with a device 6, which lays the upper sheet 2, which for this purpose has a larger surface than the honeycomb core 1, around the edge 10 and thereby bonds the folded-over semi-finished material 2 either to the lower semi-finished material 3 and/or to the honeycomb core 10, protecting the paper honeycomb core of the motor vehicle component against water, dirt and other foreign particles. The folding device 6' is faced by a corresponding stop 6 on the side of the upper die 4, so that the stroke of the pressing tool is limited by the stop 6.

FIG. 5 shows such an edge sealing arrangement at the edge 10, where the two cover layers 2, 3 are fused to each other. The sandwich components shown in sections have cover layers 2, 3 made of a hybrid yarn fabric, which can be adapted more easily to the complex shape of the honeycomb core 1. The figure further shows a region V with a tapering cross-section, where the webs 1' of the honeycomb core 1 are compressed, in order to match the preset shape of the component. The components nevertheless have an adequate strength even in this region V, which results from the consolidated cover layers 2, 3 and from the strong bond in the tapering region V with the impregnation of the compressed webs.

Figure 9:
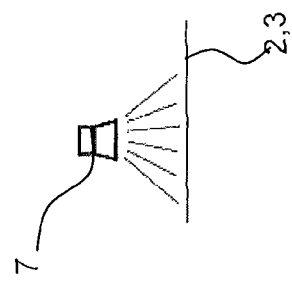
FIG. 9 is a diagrammatic representation of the process steps involved in a further embodiment of the method.

FIG. 9 shows a variation of the process sequence in which the required temperature is applied to the semi-finished materials 2, 3 not in the pressing tool 4, 4', but rather by an external heating device, for example a stove or radiator, before they are combined with the honeycomb core 1 to form a sandwich. In this case, the pressing tool 4, 4' itself does not have to be heated, or it may only have to be heated slightly in order to prevent an abrupt cooling if the thermoplastic cover layer 2, 3—this variant of the method allows for a shorter production cycle time. In addition, the material can be removed more easily from a cold tool, the formed cover layer becomes harder when using a cold tool, and any damage to the sandwich component in the finishing process can be avoided more easily. This variant can be used both for small and for large radii.

The present invention advantageously provides a sandwich component made of low-cost materials which can be produced using a likewise cost-reduced method. This allows for short process cycles and therefore economical production. The method for the production of the sandwich component requires only few process steps, and the investment costs for machinery and tooling are relatively low owing to the simple geometry and the low pressure required, which in turn reduces wear.

Using the described method, trim parts of a vehicle interior, such as roof linings, seat components, central door panels or door leaves of simple geometry, can be produced. It is also possible to produce load-bearing structures, for example a rear seat backrest, using the material combinations and process steps described above. Depending on the intended application, the weight per unit area of the cover layer and the honeycomb core can be adapted to mechanical requirements.

In addition, motor vehicle components produced from the sandwich components, especially trim parts provided for the vehicle interior, can be laminated, for example with leather, a natural textile material or a synthetic textile material, for example a microfiber material.

The invention claimed is:

1. A method for the production of a sandwich component comprising a honeycomb core (1) with a plurality of webs (1') and at least two cover layers (2, 3) the honeycomb core (1) consisting of paper, cardboard or other cellulose-based material wherein the cover layers (2, 3) are formed from a fiber-reinforced semi-finished material with a thermoplastic matrix, wherein the webs (1') of the honeycomb core (1) are at least partially accommodated in the thermoplastic matrix of the cover layer (2, 3) at connecting points (A) to the cover layer (2, 3), thus providing a composite of the sandwich component, and wherein the sandwich component has an edge seal created by joining the cover layers (2, 3) by local melting of the thermoplastic matrix of the cover layers (2, 3), the sandwich component having a flat shape or a shape curved about a radius (R), the method comprising the steps of:
   providing the honeycomb core (1) and at least two fiber-reinforced semi-finished materials with a thermoplastic matrix,
   placing the semi-finished materials above and/or below the honeycomb core,
   positioning the assembly in a pressing tool with an upper die (4') and a lower die (4) which provide the preset flat or curved shape of the sandwich component,
   applying pressure and bonding the assembly consisting of the semi-finished materials and the honeycomb core (1), the thermoplastic matrix being subjected to a temperature between a glass transition temperature and a melting point of the plastic material,
      wherein the bond is provided by at least partially melting the thermoplastic matrix and a partial accommodation of the webs (1') of the honeycomb core (1) in the thermoplastic matrix at connecting points (A) of the webs (1') to the cover layers (2, 3) represented by the fiber-reinforced semi-finished material with the thermoplastic matrix, wherein the semi-finished materials provided for forming the cover layers have dimensions which overlap a surface of the honeycomb core and its edge surfaces, and in that under the application of pressure the projecting edges of the semi-finished materials are bent around the edge of the honeycomb core, and in that the bonding of the cover layers and a sealing of the honeycomb core are provided by a local melting of the thermoplastic matrix to bond the cover layers (2, 3) to each other and to the edge of the honeycomb core.

2. The method for the production of a sandwich component comprising a honeycomb core (1) with a plurality of webs (1') and at least two cover layers (2, 3), the honeycomb core (1) consisting paper, cardboard or other cellulose-based material, wherein the cover layers (2, 3) are formed from a fiber-reinforced semi-finished material with a thermoplastic matrix, wherein the webs (1') of the honeycomb core (1) are at least partially accommodated in the thermoplastic matrix of the cover layer (2, 3) at connecting points (A) to the cover layer (2, 3), thus providing a composite of the sandwich component, and wherein the sandwich component has an edge seal created by joining the cover layers (2, 3) by local melting of the thermoplastic matrix of the cover layers (2, 3), the sandwich component having a shape curved about a radius (r), the method comprising the steps of:
   wetting the honeycomb core (1) with water (5) or with a starch-dissolving solution by spraying or by means of vapour,
   placing the wetted honeycomb core (1) in a pressing tool with an upper die (4') and a lower die (4) which provide the preset curved shape of the sandwich component,
   forming the wetted honeycomb core (1) in the pressing tool by applying a pressure at a temperature in a range of 40 to 200 degrees C.,
   providing at least two fiber-reinforced semi-finished materials with a thermoplastic matrix and placing the semi-finished materials above and/or below the honeycomb core (1),
   positioning of the assembly in the pressing tool,
   applying pressure and bonding the assembly consisting of the semi-finished materials and the honeycomb core (1), the thermoplastic matrix being subjected to a temperature between a glass transition temperature and a melting point of the plastic material,
   wherein the bond is provided by at least partially melting the thermoplastic matrix and a partial accommodation of the webs (1') of the honeycomb core (1) in the thermoplastic matrix at connecting points (A) of the webs (1') to the cover layer (2, 3) represented by the fiber-reinforced semi-finished material with the thermoplastic matrix, wherein the semi-finished materials provided for forming the cover layers have dimensions which overlap a surface of the honeycomb core and its edge surfaces, and in that under the application of pressure the projecting edges of the semi-finished materials are bent around the edge of the honeycomb core, and in that the bonding of the cover layers and a sealing of the honeycomb core are provided by a local melting of the thermoplastic matrix to bond the cover layers (2, 3) to each other and to the edge of the honeycomb core.

3. The method according to claim 1, wherein the thermoplastic matrix (2, 3) is subjected to temperature
   by a heating device included in the pressing tool, or
   by a separate heating device before the assembly is placed in the pressing tool.

4. The method according to claim 1, comprising the steps of during the bonding of the thermoplastic matrix (2, 3) to the webs (1'),
   compression of the webs (1') by a length predetermined by a tool-path control of the pressing tool.

5. The method according to claim 1, wherein the cellulose-based material is paper.

6. The method according to claim 2, wherein the cellulose-based material is paper.

7. A method for making a load-bearing component or an interior trim element for a motor vehicle selected from a floor plate, a rear seat backrest, a roof lining, a seat component, a central door panel and a door leaf, wherein the component is a sandwich component comprising a honeycomb core (1) with a plurality of webs (1') and at least two cover layers (2, 3), the honeycomb core (1) consisting of paper, cardboard or other cellulose-based material, wherein the cover layers (2, 3) are formed from a fiber-reinforced semi-finished material with a thermoplastic matrix, wherein the webs (1') of the honeycomb core (1) are at least partially accommodated in the thermoplastic matrix of the cover layer (2, 3) at connecting points (A) to the cover layer (2, 3), thus providing a composite of the sandwich component, and wherein the sandwich component has an edge seal created by joining the cover layers (2, 3) by local melting of the thermoplastic matrix of the cover layers (2, 3), the sandwich component having a flat shape or a shape curved about a radius (R), the method comprising the steps of:
   providing the honeycomb core (1) having the edge (10) dimensions of the load-bearing component or an interior trim element to be produced, and at least first and second fiber-reinforced semi-finished materials with a thermoplastic matrix, placing the semi-finished materials of the cover layers (2, 3) above and below the honeycomb core, wherein the semi-finished materials overlap around the edge (10) of the honeycomb core (1), positioning the assembly in a pressing tool with an upper die (4') and a lower die (4) which provide the preset flat or curved shape of the sandwich component, and with an upper folding device (6') associated with the upper die (4') and a lower folding device (6) associated with the lower die (4) for pressing and fusing the semi-finished materials of the cover layers (2, 3) around the edge of the sandwich component, wherein the stroke of the pressing tool is limited by lower folding device (6) as a stop for upper folding device (6'), applying pressure via the die and bonding the assembly consisting of the semi-finished materials and the honeycomb core (1), wherein the semi-finished materials are joined around the periphery of the core (1) and to the side of the core by the pressure of the upper and lower folding devices (6', 6), the thermoplastic matrix being subjected to a temperature between a glass transition temperature and a melting point of the plastic material, wherein the bond is provided by at least partially melting the thermoplastic matrix and a partial accommodation of the webs (1') of the honeycomb core (1) in the thermoplastic matrix at connecting points (A) of the webs (1') to the cover layers (2, 3) represented by the fiber-reinforced semi-finished material with the thermoplastic matrix, wherein the semi-finished materials provided for forming the cover layers have dimensions which overlap a surface of the honeycomb core and its edge surfaces, and in that under the application of pressure the projecting edges of the semi-finished materials are bent around the edge of the honeycomb core, and in that the bonding of the cover layers and a sealing of the honeycomb core are provided by a local melting of the thermoplastic matrix, and installing the sandwich component as a load-bearing component or an interior trim element of a motor vehicle.

\* \* \* \* \*